(12) United States Patent
Arribe

(10) Patent No.: US 11,001,399 B2
(45) Date of Patent: May 11, 2021

(54) METHOD OF MEASURING AIRCRAFT BRAKE DISK WEAR

(71) Applicant: SAFRAN LANDING SYSTEMS, Velizy-Villacoublay (FR)

(72) Inventor: Baptiste Arribe, Velizy-Villacoublay (FR)

(73) Assignee: SAFRAN LANDING SYSTEMS, Velizy-Villacoublay (FR)

( * ) Notice: Subject to any disclaimer, the term of this patent is extended or adjusted under 35 U.S.C. 154(b) by 25 days.

(21) Appl. No.: 16/017,461

(22) Filed: Jun. 25, 2018

(65) Prior Publication Data

US 2018/0370656 A1 Dec. 27, 2018

(30) Foreign Application Priority Data

Jun. 26, 2017 (FR) ...................................... 1755828

(51) Int. Cl.
*G06T 7/00* (2017.01)
*B64F 5/60* (2017.01)
(Continued)

(52) U.S. Cl.
CPC ................ *B64F 5/60* (2017.01); *B60T 17/22* (2013.01); *B60T 17/221* (2013.01); *B64C 25/42* (2013.01); *F16D 66/02* (2013.01); *G01B 5/0028* (2013.01); *G06T 7/001* (2013.01); *G06T 7/0004* (2013.01); *G06T 7/74* (2017.01); *G07C 5/008* (2013.01); *G07C 5/085* (2013.01); *G07C 5/0808* (2013.01);
(Continued)

(58) Field of Classification Search
CPC ......... B64F 5/60; G06T 7/0004; G06T 7/001; G06T 7/74; G06T 2207/30164; G06T 2207/30204; G06T 2207/30252; F16D 66/02; G01B 5/0028; B64C 25/42; G07C 5/085; G07C 5/0808; G07C 5/008
See application file for complete search history.

(56) References Cited

U.S. PATENT DOCUMENTS 6,529,620 B2 * 3/2003 Thompson ............. G06Q 10/06
382/141
6,659,233 B2 * 12/2003 DeVlieg ............... B60T 8/1703
188/1.11 E
(Continued)

FOREIGN PATENT DOCUMENTS

CN 104455121 A 3/2015
EP 1707918 A1 10/2006
EP 3051250 A1 8/2016

OTHER PUBLICATIONS

Rapport de Recherche Préliminaire / Opinion Écrite, dated Mar. 12, 2018, issued in corresponding French Application No. 1755828, filed Jun. 26, 2017, 6 pages.

*Primary Examiner* — Aaron W Carter
(74) *Attorney, Agent, or Firm* — Christensen O'Connor Johnson Kindness PLLC

(57) ABSTRACT

The present disclosure relates to a method of measuring wear of a disk in an aircraft brake having a wear indicator that is movably mounted on a stationary portion of the aircraft brake and that moves progressively with increasing wear of the disk. The method includes using a picture-taking appliance to take at least one photograph of the wear indicator while an aircraft is stationary on the ground, and estimating a position of the wear indicator and a wear level of the disk by analyzing the photograph.

9 Claims, 2 Drawing Sheets

(51) Int. Cl.
  *B64C 25/42* (2006.01)
  *B60T 17/22* (2006.01)
  *G01B 5/00* (2006.01)
  *F16D 66/02* (2006.01)
  *G06T 7/73* (2017.01)
  *G07C 5/00* (2006.01)
  *G07C 5/08* (2006.01)

(52) U.S. Cl.
  CPC ............ *G06T 2207/30164* (2013.01); *G06T 2207/30204* (2013.01); *G06T 2207/30252* (2013.01)

(56) References Cited

U.S. PATENT DOCUMENTS

| | | | | |
|---|---|---|---|---|
| 6,929,333 | B2* | 8/2005 | DeVlieg | B60T 8/1703 188/1.11 L |
| 7,416,059 | B2* | 8/2008 | Devlieg | B60T 8/1703 188/1.11 E |
| 7,464,796 | B2* | 12/2008 | Devlieg | B60T 8/1703 188/1.11 E |
| 7,484,599 | B2* | 2/2009 | DeVlieg | B60T 8/1703 188/1.11 E |
| 7,699,408 | B2* | 4/2010 | DeVlieg | B60T 8/1703 188/1.11 L |
| 7,901,014 | B2* | 3/2011 | Miller | B60T 17/22 188/79.52 |
| 7,946,394 | B2* | 5/2011 | DeVlieg | B60T 8/1703 188/1.11 E |
| 8,041,490 | B2* | 10/2011 | DeVlieg | B60T 8/1703 188/1.11 L |
| 8,201,666 | B2* | 6/2012 | DeVlieg | B60T 8/1703 188/1.11 E |
| 8,578,766 | B2* | 11/2013 | Canterbury | G01B 5/0028 73/121 |
| 9,786,042 | B2* | 10/2017 | Venkatesha | B60T 17/221 |
| 2002/0169746 | A1* | 11/2002 | Cowman | G06F 16/93 |
| 2003/0102191 | A1* | 6/2003 | DeVlieg | B60T 8/1703 188/1.11 W |
| 2003/0120501 | A1* | 6/2003 | Peters | G08G 5/0021 705/1.1 |
| 2003/0121732 | A1* | 7/2003 | Miller | F16D 66/028 188/1.11 W |
| 2004/0084252 | A1* | 5/2004 | DeVlieg | B60T 8/1703 188/1.11 W |
| 2005/0269873 | A1* | 12/2005 | DeVlieg | B60T 8/1703 303/122.03 |
| 2007/0200426 | A1* | 8/2007 | DeVlieg | B60T 8/1703 303/20 |
| 2007/0200427 | A1* | 8/2007 | DeVlieg | B60T 8/1703 303/20 |
| 2008/0275599 | A1* | 11/2008 | DeVlieg | B60T 8/1703 701/16 |
| 2009/0095576 | A1* | 4/2009 | Miller | B60T 17/22 188/1.11 E |
| 2009/0120735 | A1* | 5/2009 | DeVlieg | B60T 8/1703 188/1.11 L |
| 2009/0150031 | A1* | 6/2009 | DeVlieg | B60T 8/1703 701/48 |
| 2009/0205910 | A1 | 8/2009 | Cahill | |
| 2009/0229926 | A1* | 9/2009 | Schaefer | F16D 66/025 188/1.11 L |
| 2010/0170752 | A1* | 7/2010 | DeVlieg | B60T 8/1703 188/1.11 L |
| 2010/0250028 | A1* | 9/2010 | DeVlieg | B60T 8/1703 701/3 |
| 2011/0144879 | A1* | 6/2011 | Miller | B60T 17/22 701/70 |
| 2012/0259500 | A1* | 10/2012 | DeVlieg | B60T 8/1703 701/29.4 |
| 2014/0297095 | A1* | 10/2014 | Vaney | F16D 66/026 701/29.4 |
| 2016/0225130 | A1* | 8/2016 | Venkatesha | B60T 17/221 |
| 2016/0272341 | A1* | 9/2016 | Van Horn | B64D 45/00 |
| 2017/0002884 | A1* | 1/2017 | Cavalli | F16D 66/028 |
| 2017/0146084 | A1 | 5/2017 | Drewes et al. | |
| 2018/0017118 | A1* | 1/2018 | Stoeger | B60T 17/221 |
| 2018/0357613 | A1* | 12/2018 | Engelbart | G06Q 10/20 |
| 2018/0370656 | A1* | 12/2018 | Arribe | G07C 5/085 |
| 2019/0266715 | A1* | 8/2019 | Myers | B64C 39/024 |
| 2019/0293411 | A1* | 9/2019 | Nowaczyk | H04N 5/247 |
| 2020/0080609 | A1* | 3/2020 | Muniraju | G01D 5/42 |

* cited by examiner

METHOD OF MEASURING AIRCRAFT BRAKE DISK WEAR

PRIORITY CLAIM

This application claims priority under 35 U.S.C. § 119 to French Patent Application No. 1755828, filed Jun. 26, 2017, which is herein incorporated by reference in its entirety.

BACKGROUND

The present disclosure relates to the method of measuring aircraft brake disk wear.

The brakes of modern aircraft comprise a stack of disks (also referred to as a heat sink) that are pressed against one another by means of pistons or pushers in order to generate a braking moment suitable for slowing down the wheel with which the brake is associated. Each time braking is performed, the disks suffer wear, and it is important to know the state of their wear in order to make provision for replacing them with a stack of disks of appropriate thickness. In this respect, brakes are generally provided with at least one wear indicator that is slidably mounted on a stationary portion (e.g. the hydraulic ring of the brake) and that is constrained to come into contact with the face of the disks that faces the pistons of the brake, so that it moves in its housing progressively with increasing wear of the disks. Its position is thus indicative of the state of wear of the stack of disks.

To give an order of magnitude, heat sinks are typically changed after 2000 to 4000 landings, which, depending on the rate of use of an aircraft, can represent one year of operation of the aircraft. Over that length of time, the stack of disks loses 5 centimeters (cm) to 6 cm of thickness.

Operators in charge of maintenance verify the position of the wear indicator regularly (typically once a week) in order to verify the wear state of disks, and in order to replace them with new disks if the wear indicator reaches a maximum wear position. That constitutes a method that is elementary, and reliable, but that does not make it possible to estimate accurately the current wear of the disks in the inspected brake. That method makes it difficult to provide any automatic tracking of brake disk wear on a given aircraft.

In order to improve the tracking of brakes in service, proposals are made in U.S. Patent Application No. US 2009/0205910 to replace the wear indicator with a wear sensor capable of generating at any time a signal that is representative of the state of wear of the disks. Nevertheless, such a sensor requires development that is specific and expensive. It needs to be very reliable, it must not break, and it must not drift. The environmental conditions of its operation are severe: vibration, carbon dust, liquid spray, high temperatures. Furthermore, all aircraft have a plurality of braked wheels, and thus a plurality of brakes: e.g. four (A320, B737), eight (A330, B787), twelve (B777), sixteen (B747 or A380) braked wheels, and it is important to distinguish between all of the wear signals coming from multiple brakes so as to associate them with the appropriate heat sink. Finally, such a sensor involves modifying brakes that are in service, and modifying the electric cabling going down to the brakes, which gives rise to major requalification costs, and which involves campaigns for modifying aircraft that are in service.

SUMMARY

In some embodiments, this disclosure relates to a method of measuring aircraft brake disk wear that enables wear to be tracked reliably, but does not require existing brakes to be modified. Accordingly, there is provided a method of measuring disk wear in an aircraft brake having a wear indicator that is movably mounted on a stationary portion of the brake and that moves progressively with increasing disk wear. The method of the present disclosure comprises taking at least one photograph of the wear indicator while the aircraft is stationary on the ground, and analyzing the photograph in order to estimate the position of the wear indicator.

Each of the photographs may be analyzed directly by the picture-taking appliance used for taking the photograph. Alternatively, the photograph may be sent to a remote receiver for storage and analysis, e.g. a maintenance server of the airline or of the brake manufacturer. In practice, the photograph may be taken by the operator merely by using a smartphone.

By associating the estimated wear with a number of flights taken by the aircraft when the picture is taken, it becomes possible to track the wear of disks during their lifetime and thus to verify that the brakes are operating properly, and indeed to generate statistics concerning the use of the brakes. The number of flights taken may be input by the operator, or it may be deduced from flight data supplied by the airline.

The method in some embodiments includes inputting into the picture-taking appliance the identifier of the aircraft (e.g. its registration number) and the position of the brake that is to be photographed. On the basis of this data, the method then includes the step of generating a mask that is displayed on a display screen of the picture-taking appliance, so that the operator can cause the mask to coincide with the image seen through the camera of the appliance. This assistance in taking pictures serves to facilitate analysis of the photograph considerably, since the photograph is taken from a picture-taking angle and at a distance that are substantially identical on each occasion.

In one aspect, the present disclosure generally provides a method of measuring wear of at least one disk in an aircraft brake having a wear indicator that is movably mounted on a stationary portion of the aircraft brake and that moves progressively with increasing wear of the at least one disk. The method generally includes using a picture-taking appliance to take at least one photograph of the wear indicator while an aircraft is stationary on the ground, and estimating a position of the wear indicator and a wear level of the at least one disk by analyzing the at least one photograph. In another aspect, the method includes inputting an identifier of the aircraft, inputting a position of the aircraft brake in question, and presenting a mask on a display screen of the picture-taking appliance, which mask is specific for providing assistance in positioning the picture-taking appliance correctly relative to the aircraft brake in question by bringing the mask into alignment with an outline of a portion of at least one of the aircraft brake and the wear indicator as visible on the display screen, prior to taking the photograph. In another aspect, the method includes analyzing the at least one photograph by an analysis algorithm installed in the picture-taking appliance. In another aspect, the method includes storing the position of the wear indicator in a database in association with an identifier of the aircraft and with a position of the aircraft brake. In another aspect, the position of the wear indicator is associated with at least one of a date and a time of the photograph, a geolocation of the photograph, and a number of flights taken by the aircraft at the time the photograph is taken. In another aspect, the position of the wear indicator is sent to a remote server for storage and statistical analysis. In another aspect, the wear indicator includes a visual marker that is identifiable in the photograph.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of the present disclosure will become more readily appreciated as the same become better understood by reference to the following detailed description, when taken in conjunction with the accompanying drawings, wherein.

DETAILED DESCRIPTION

The detailed description set forth below in connection with the appended drawings, where like numerals reference like elements, are intended as a description of various embodiments of the present disclosure and are not intended to represent the only embodiments. Each embodiment described in this disclosure is provided merely as an example or illustration and should not be construed as precluding other embodiments. The illustrative examples provided herein are not intended to be exhaustive or to limit the disclosure to the precise forms disclosed.

In the following description, specific details are set forth to provide a thorough understanding of exemplary embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may include references to directions, such as "forward," "rearward," "front," "rear," "upward," "downward," "top," "bottom," "right hand," "left hand," "lateral," "medial," "in," "out," "extended," etc. These references, and other similar references in the present application, are only to assist in helping describe and to understand the particular embodiment and are not intended to limit the present disclosure to these directions or locations.

The present application may also reference quantities and numbers. Unless specifically stated, such quantities and numbers are not to be considered restrictive, but exemplary of the possible quantities or numbers associated with the present application. Also in this regard, the present application may use the term "plurality" to reference a quantity or number.

Figure 1:
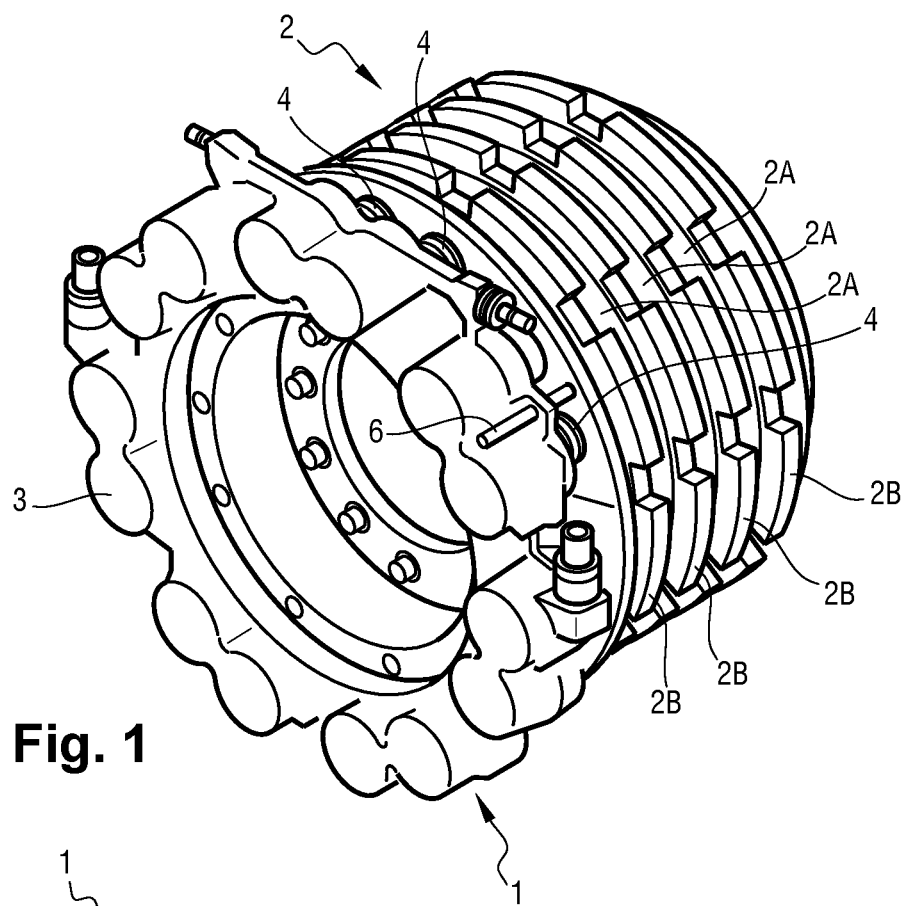
FIG. 1 is a perspective view of a conventional aircraft brake fitted with a wear indicator.

As shown in FIG. 1, a typical aircraft brake comprises a torsion tube having a stack of disks (or heat sink) 2 engaged thereon made up of stator disks 2A and of rotor disks 2B, the stack extending between a hydraulic ring 3 carrying pistons 4 and a rear plate fastened to the other end of the tube. The brake as constituted in this way is engaged on an axle of aircraft landing gear that also receives a wheel having a rim with bars for driving the rotor disks 2B in rotation. The brake 1 has a wear indicator 6 (often there are two of them on a single brake), in this example a single metal rod slidably mounted on the hydraulic ring 3 and constrained to remain in contact with the stack of disks, so that the wear indicator moves back progressively with increasing wear of the disks. By way of example, the indicator may be coupled to a thrust plate arranged on the front of the heat sink 2, or it may be pushed towards the first stator by a spring. All this is well known, and is recalled merely by way of illustration.

Figure 2:
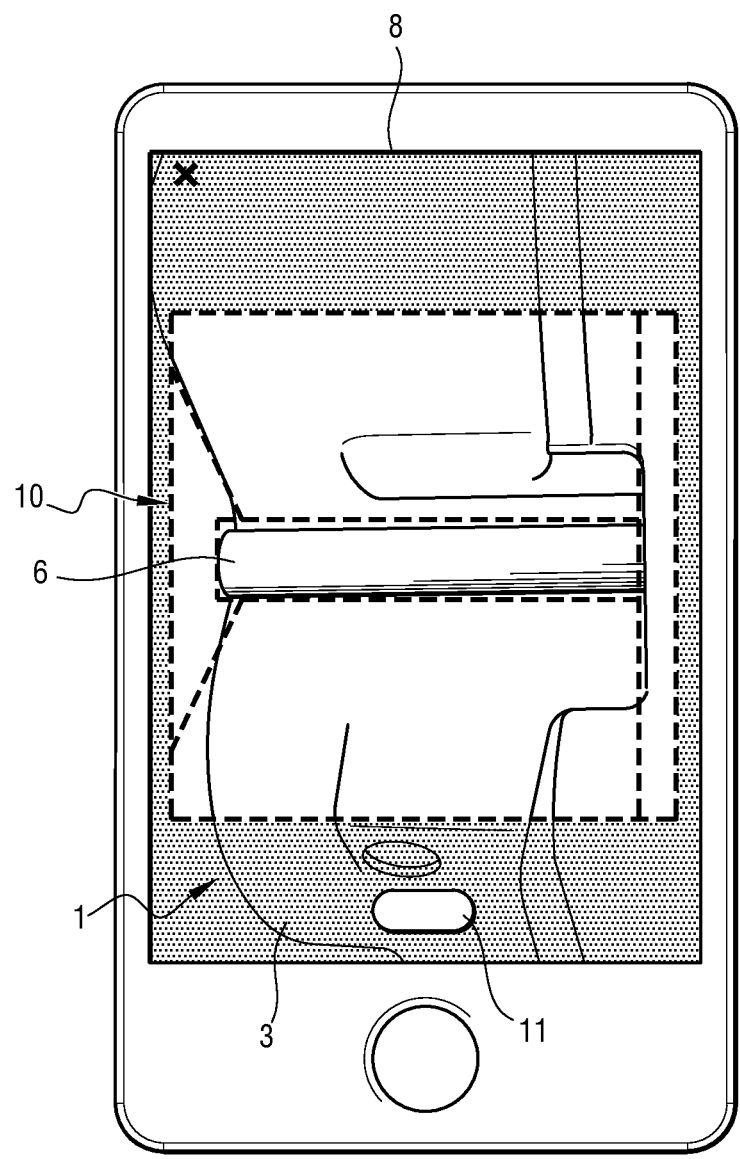
FIG. 2 is a view of a picture-taking appliance used by an operator for performing a representative embodiment of a method of the present disclosure and while taking a picture.

In the present disclosure, the maintenance operator seeking to know the state of wear of the stack of disks goes up to the brake in question with a picture-taking appliance 8, in this example merely a smartphone. The procedure comprises the following steps:

the operator starts an embedded application dedicated to measuring wear and installed in the picture-taking appliance;

the operator inputs the identifier of the aircraft (e.g. its registration number), and also the position of the brake on the aircraft on which wear is to be measured;

as shown in FIG. 2, the application presents a mask 10 specific to the brake that has been identified in this way on the screen of the picture-taking appliance 8, the mask in this example comprising a series of dashed-line outlines;

the operator then moves the picture-taking appliance 8 so as to position it in such a manner that the outline of the hydraulic ring 3 and of the wear indicator 6 as seen by the camera of the appliance and as displayed on the display screen of the appliance match with the stylized outlines of the mask 10;

once the picture-taking appliance is correctly positioned, the operator takes the photograph, e.g. by pressing on the virtual button 11 on the screen. Where appropriate, correct positioning may be confirmed by issuing a sound signal or indeed by emphasizing the outlines of the mask 10. In a variant, the photograph may be taken automatically as soon as the appliance detects that it is correctly positioned; and after the photograph has been validated, it is analyzed in order to estimate the position of the wear indicator and thus to estimate the wear of the disks of the heat sink.

The photograph is made much easier to analyze by the fact that the picture-taking angle and the distance between the appliance and the brake are identical from one photograph to the next. It is only the position of the wear indicator that needs to be identified in a visual environment that is otherwise substantially constant. Simple visual recognition algorithms can then be used to determine reliably the position of the wear indicator. This position can then be associated immediately with an amount of wear of the stack of disks 2. The photograph may be analyzed directly by the application embedded in the appliance. Alternatively, the photograph may be sent automatically for analysis by a maintenance server, e.g. belonging to the airline or to the brake manufacturer. The photograph is then analyzed remotely.

It is thus possible to build up a database that associates, for each brake or heat sink, the identifier of the aircraft on which it is mounted, its position on the aircraft, the multiple photographs that have been taken together with the associated estimates of wear, the dates, times, and geolocations of the photographs, and the number of flights taken by the aircraft when the photograph was taken.

The database makes it possible to track the wear of each heat sink, to track the overall wear of the heat sink of a given aircraft, or to establish wear statistics per aircraft, per route served, per company fleet, . . . , and it makes it possible to program in advance any action for replacing brakes, given the predictable increase in the wear of the heat sinks.

In practice, the database also includes the serial number of each heat sink for each of the brakes so that it can associate the wear data with the corresponding heat sink.

Various methods of the present disclosure thus make it possible to provide much richer processing of heat sink wear data, at the expense of developing an application that is relatively simple, and without requiring any modification to existing brakes nor any development of an onboard wear sensor.

Figure 3:
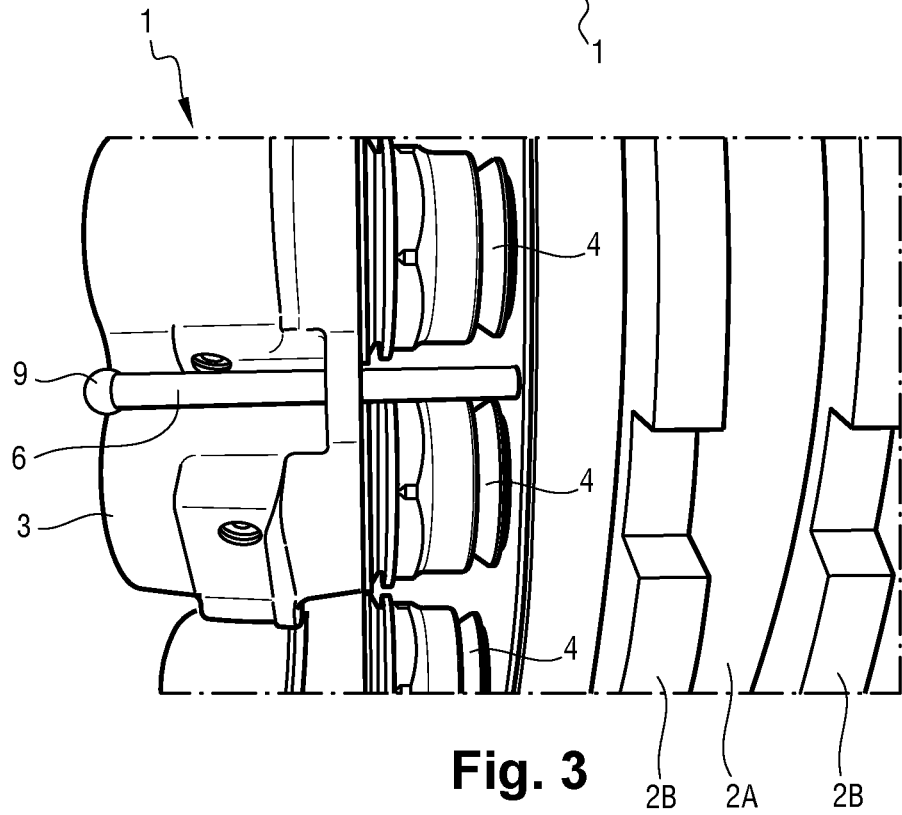
FIG. 3 is a fragmentary view of the FIG. 1 brake showing the wear indicator.

In a particular aspect of the present disclosure, in order to facilitate analysis of the photograph, the free end of the wear indicator is provided with a visual marker that can easily be identified and located, e.g., a sphere 9 as shown in FIG. 3. In order to improve identification of the sphere 9, it is preferably painted in a high-contrast color, such as fluorescent orange. To further facilitate identifying the wear indicator in the photograph, the operator may locally clean the ring, which is generally painted white, so as to increase the contrast between the ring and the wear indicator.

The present disclosure is not limited to the above description, but on the contrary it covers any variant coming within the ambit defined by the claims.

In particular, although the representative method described includes the step of displaying a mask on the display screen in order to facilitate positioning the picture-taking appliance, it is possible to omit this step if the image analysis algorithm is sufficiently powerful to identify the wear indicator and its position regardless of the picture-taking angle and the distance of the appliance from the brake in question.

Likewise, although the representative method described includes inputting an aircraft identifier, that data may be obtained by other means such as geolocation, or receiving an identification signal delivered by the aircraft itself.

Although the representative method as described includes inputting the position of the brake on the aircraft, this data could equally well be obtained by other means. In particular, it is possible to require the operator to take photographs of the brakes in a particular sequence, so as to identify systematically which is the brake in the photograph. For example on a four-brake aircraft of A320 or B737 type, the operator may be requested to photograph the brakes in the order of their numbers (brakes 1 to 4, starting with the outer left brake and going to the outer right brake), while also requiring the operator to indicate there has been a change of brake prior to photographing each new brake.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The embodiments of the invention in which an exclusive property or privilege is claimed are defined as follows:

1. A method of measuring wear of at least one disk in an aircraft brake having a wear indicator that is movably mounted on a stationary portion of the aircraft brake and that moves progressively with increasing wear of the at least one disk, the method comprising:
    using a picture-taking appliance to take, at a predetermined picture-taking angle and at a predetermined distance between the picture-taking appliance and the aircraft brake, at least one photograph of the wear indicator while an aircraft is stationary on the ground;
    estimating a position of the wear indicator in the at least one photograph by analyzing said at least one photograph; and
    deducing a wear level of the at least one disk directly from the position of the wear indicator, without estimating a length of the wear indicator.

2. The method according to claim 1, further comprising:
    inputting an identifier of the aircraft;
    inputting a position of the aircraft brake; and
    presenting a mask on a display screen of the picture-taking appliance, which mask is specific for providing assistance in positioning the picture-taking appliance correctly relative to the aircraft brake in question by bringing the mask into alignment with an outline of a portion of at least one of the aircraft brake and the wear indicator as visible on the display screen, prior to taking the photograph.

3. The method according to claim 1, wherein the at least one photograph is analyzed by an analysis algorithm installed in the picture-taking appliance.

4. The method according to claim 1, wherein the position of the wear indicator is stored in a database in association with an identifier of the aircraft and with a position of the aircraft brake.

5. The method according to claim 2, wherein the position of the wear indicator is associated with at least one of the following data items:
    a date and a time of the photograph;
    a geolocation of the photograph; or
    a number of flights taken by the aircraft at the time the photograph is taken.

6. The method according to claim 1, wherein the position of the wear indicator is sent to a remote server for storage and statistical analysis.

7. The method according to claim 1, wherein the wear indicator comprises a visual marker that is identifiable in the photograph.

8. The method according to claim 1, wherein deducing the wear level of the at least one disk is based upon the position of the wear indicator in the at least one photograph.

9. The method according to claim 1,
    wherein using the picture-taking appliance to take the at least one photograph includes taking a plurality of photographs of the wear indicator at the predetermined picture-taking angle and at the predetermined distance between the picture-taking appliance and the aircraft brake,
    wherein deducing the wear level of the at least one disk is based upon the plurality of photographs of the wear indicator taken at the predetermined picture-taking angle and at the predetermined distance between the picture-taking appliance and the aircraft brake.

\* \* \* \* \*